United States Patent
Gawargy et al.

(10) Patent No.: US 7,058,068 B2
(45) Date of Patent: Jun. 6, 2006

(54) SESSION INITIATION PROTOCOL BASED ADVANCED INTELLIGENT NETWORK/INTELLIGENT NETWORK MESSAGING

(75) Inventors: Michael M. Gawargy, Nepean (CA); Johanna Pearl Ruth Nicoletta, Nepean (CA)

(73) Assignee: Nortel Networks Limited, St. Laurent (CA)

(*) Notice: Subject to any disclaimer, the term of this patent is extended or adjusted under 35 U.S.C. 154(b) by 917 days.

(21) Appl. No.: 09/725,921

(22) Filed: Nov. 30, 2000

(65) Prior Publication Data

US 2002/0141381 A1   Oct. 3, 2002

(51) Int. Cl.
*H04L 12/28* (2006.01)
*H04L 12/56* (2006.01)
*H04L 12/66* (2006.01)
*G06F 15/173* (2006.01)

(52) U.S. Cl. .............. 370/410; 370/352; 370/395; 709/224

(58) Field of Classification Search ........ 370/229–264, 370/399, 522, 352–356, 389–395, 400–428, 370/466–469; 709/228–238, 245–249; 455/522, 455/422

See application file for complete search history.

(56) References Cited

U.S. PATENT DOCUMENTS

| | | | |
|---|---|---|---|
| 5,701,301 A * | 12/1997 | Weisser, Jr. ................. 370/428 |
| 6,055,232 A * | 4/2000 | Ward et al. ................. 370/385 |
| 6,122,363 A * | 9/2000 | Friedlander et al. ........ 379/230 |
| 6,363,424 B1 * | 3/2002 | Douglas et al. ............. 709/224 |
| 6,574,201 B1 * | 6/2003 | Kreppel ...................... 370/328 |
| 6,608,832 B1 * | 8/2003 | Forslow ...................... 370/353 |
| 6,625,141 B1 * | 9/2003 | Glitho et al. ................ 370/352 |
| 6,636,502 B1 * | 10/2003 | Lager et al. ................. 370/352 |
| 6,693,898 B1 * | 2/2004 | Su et al. ..................... 370/355 |
| 6,735,621 B1 * | 5/2004 | Yoakum et al. ............. 709/218 |
| 6,795,430 B1 * | 9/2004 | Ong et al. .................... 370/352 |
| 2002/0090940 A1 * | 7/2002 | Chen et al. ................. 455/422 |
| 2003/0165135 A1 * | 9/2003 | Itzkovitz et al. ............ 370/352 |
| 2004/0017798 A1 * | 1/2004 | Hurtta et al. ................ 370/352 |
| 2004/0202156 A1 * | 10/2004 | Fonden et al. .............. 370/389 |

OTHER PUBLICATIONS

Implementing Intelligent Network Services with the Session Initiation Protocol (undated) Tech-Report No. CUCS 002-99 Jonathan Lennox; Henning Schulzrinne; Thomas F. La Porta.

(Continued)

*Primary Examiner*—Man U. Phan
(74) *Attorney, Agent, or Firm*—Kent Daniels; Ogilvy Renault LLP

(57) ABSTRACT

A method and system enables distributed transaction oriented telephony functionality for telephony services in a broadband packet network. Exemplary distributed transaction oriented telephony functionality includes Intelligent Network (IN) and Advanced Intelligent Network (AIN) functionality accessed through the legacy Common Channel Signaling (CCS) network using transaction-based messaging protocols, such as Intelligent Network Application Part (INAP) and/or Transaction Capability Application Part (TCAP) protocols. A functional content of a transaction message, such as a TCAP message, is encapsulated in a Protocol Data Unit (PDU) of the broadband packet network. The PDU is forwarded through the broadband packet network to a second network element. The functionality is then invoked using the encapsulated transaction message functional content. In preferred embodiments the PDU is a Session Initiation Protocol (SIP) envelope, into which TCAP message functional content can be mapped.

68 Claims, 5 Drawing Sheets

OTHER PUBLICATIONS

IETF Internet Draft: Interworking between SIP and INAP (Jul. 2000) H. Schulzrinne; L. Slutsman; I. Faynberg and H. Lu.

IETF Internet Draft: SIP/IN Interworking (Jun. 2000) D. Lebovits.

IETF Internet Draft: Accessing IN services from SIP networks (May 5, 2000) V. Gurbani.

IETF Internet Draft: ISUP parameters expected in SIP messages (Jun. 1999) Adam Roach.

IETF Internet Draft: MIME type for ISUP messages (Oct. 1999) Mark Watson.

IETF Internet Draft: The SIP ISUP/MIME type (Jul. 1999) Eric Zimmerer; Aparna Vemuri.

IETF Internet Draft: Best Current Practice for ISUP to SIP mapping (Aug. 1999) Gonzalo Camarillo.

IETF Internet Draft: SIP Best Current Practice for Telephony Interworking (Sep. 1999) Eric Zimmerer; Aparna Vemuri; Vijay Nadkarni; Brian Morgan; Gonzalo Camarillo.

International Searching Authority, European Patent Office. WO 00 21320 A (Nokia Networks Oy; Tammela Reino (FI); Hurtta Tuija (FI); Walleniu) Apr. 13, 2000, p. 2, line 29; p. 3, line 2; p. 10, line 6, p. 11, line 11.

Schulzrinne H et al: "Interworking between SIP and INAP" INTERNET Jul. 2000, XP002901410 paragraph '03.1, paragraph 03.2.

Chiang T.C. et al: "In Services For Converged (INTERNET) Telephony" IEEE Communications Magazine, IEEE Service Center, Piscataway, N.J. US, vol. 38, No. 6, Jun. 2000, pp. 108-115, XP000932653 ISSN: 0163-6804, p. 112, left-hand col., line 1-line 36; p. 112, right-hand col., line 48-line 63.

* cited by examiner

SESSION INITIATION PROTOCOL BASED ADVANCED INTELLIGENT NETWORK/INTELLIGENT NETWORK MESSAGING

CROSS-REFERENCE TO RELATED APPLICATIONS

This is the first application filed for the present invention.

MICROFICHE APPENDIX

Not Applicable.

TECHNICAL FIELD

The present invention relates to intelligent network/advanced intelligent network (IN/AIN) services, and, in particular, to a method of enabling IN/AIN functionality for telephony services deployed in a broadband packet network.

BACKGROUND OF THE INVENTION

Modern telephony services deployed in the Public Switched Telephone Network (PSTN) commonly rely on distributed transaction oriented telephony functionality, such as, for example Intelligent Network and/or Advanced Intelligent Network (IN/AIN) functionality in order to deliver sophisticated call control services to subscribers. Typically, this distributed functionality involves various network elements (e.g. Service Control Points (SCP's), Intelligent Peripherals (IPe's) and Interactive Voice Response (IVR) servers) and transaction-based protocols (such as Intelligent Network Application Part (INAP), and Transaction Capability-Application Part (TCAP)) deployed in the Common Channel Signaling (CCS) network. INAP and TCAP operate over conventional Signaling System 7 (SS7) infrastructure, and supplements legacy Integrated Services Digital Network-User Part (ISUP) signaling by providing a query/response protocol for accessing routing information and telephony services provided by IN/AIN capable network elements within the CCS network.

A deficiency of the current PSTN/CCS network is that its monolithic architecture and slow (64 kbs) signaling speed reduces network scalability. As the amount of telephony traffic increases, network service providers have increasing difficulty provisioning sufficient CCS network resources to handle the associated ISUP and INAP/TCAP signaling. In this respect, one particular difficulty is the need to provide each network element (e.g. an SCP) with sufficient SS7 signaling ports. Typically, the number of SS7 signaling ports is limited by both the hardware and software of the network element implementation. In the case of legacy CCS network elements, the monolithic design of both the hardware and software tends to make the addition of new SS7 signaling ports difficult, and therefore expensive. However, failure to provision sufficient SS7 signaling ports can lead to port exhaustion, and consequent reduction in services as the affected network element is unable to accept any new ISUP or TCAP messages until a port becomes available.

Another limitation of the legacy CCS network is that its monolithic design, and the high cost of CCS network elements, create significant barriers to the entry of network service providers who lack CCS network infrastructure.

In order to address issues of scalability within the PSTN, various efforts have been made to deploy telephony services in a broadband packet network such as an internet protocol (IP) network. Various protocols have been proposed to enable this functionality, including various Voice over IP (VoIP) protocols for carrying bearer traffic, as well as session set-up and routing protocols (such as Multi-protocol Label Switched Path (MPLS) and Session Initiation Protocol (SIP)) for establishing communications sessions and for routing the bearer traffic through the network. In general, it is also possible to deploy resources in a broadband packet network that enable services similar to those provided by the legacy CCS network. However, in order to establish telephone connections between points in the PSTN and a packet network, interaction between resources of the broadband packet and CCS networks is essential. One method of accomplishing this has been proposed by V. Gurbani in an Internet Engineering Task Force (IETF) draft entitled "Accessing IN services from SIP networks". FIG. 1 is a block diagram illustrating the system of Gurbani for enabling IN/AIN functionality for telephony services deployed in a SIP network 2. As shown in FIG. 1, Gurbani teaches an IN state machine 4 overplayed on the conventional SIP state machine 6 within a SIP server 8 of the SIP network 2. The IN state machine 4 operates to generate conventional TCAP messages reflecting the state of the SIP state machine 6, and forwards these messages though the legacy CCS network 10 to an IN/AIN capable device 12 (e.g. an SCP and/or an IPe). TCAP messages (e.g. response messages) are received over the CCS network 10 by the IN state machine 4 and passed to the SIP state machine 6 to control call setup through the SIP network 2.

Thus, in the system of Gurbani, the IN state machine 4 operates as an interface between the SIP network 2 and the conventional CCS network 10, which enables a SIP server 8 to emulate a Service Switch Point (SSP) of the PSTN for the purposes of accessing IN/AIN functionality. However, this system suffers from the limitation that it increases the amount of TCAP traffic in the CCS network 10, and thus increases the risk of signaling port exhaustion in the CCS network element 12. This risk increases as the amount of telephony traffic in the SIP network 2 increases.

Accordingly, a method and apparatus that enables access to distributed transaction oriented telephony functionality for telephony services deployed in a broadband packet network while mitigating the risk of signaling port exhaustion in CCS network elements, remains highly desirable.

SUMMARY OF THE INVENTION

An object of the present invention is to provide a method and apparatus that enables access to distributed transaction oriented telephony functionality for telephony services deployed in a broadband packet network while avoiding signaling port exhaustion in CCS network elements.

Accordingly, an aspect of the present invention provides a method of enabling distributed transaction oriented telephony functionality for telephony services in a broadband packet network. A functional content of a transaction message is encapsulated in a Protocol Data Unit (PDU) of the broadband packet network. The PDU is forwarded through the broadband packet network to a second network element. The functionality is then invoked using the encapsulated transaction functional content.

Another aspect of the present invention provides a system adapted for enabling distributed transaction oriented telephony functionality for telephony services in a broadband packet network. The system comprises: a first network element adapted to encapsulate at least a functional content of a transaction message in a Protocol Data Unit (PDU) of the broadband packet network; and a second network element adapted to invoke the functionality using the enncapsulated transaction functional content.

Another aspect of the present invention provides a network node adapted to enable distributed transaction oriented telephony functionality for telephony services in a broadband packet network. The node comprises: means for encapsulating at least a functional content of a transaction message in a Protocol Data Unit (PDU) of the broadband packet network; and means for forwarding the PDU through the broadband packet network to a network element adapted to provide the functionality.

The broadband packet network comprises any one or more of: an Asynchronous Transfer Mode (ATM) network; an internet Protocol (IP) network; a Frame Relay (FR) network; and an Integrated Services Digital Network (ISDN). In preferred embodiments of the invention, the broadband packet network comprises an IP Network, and the PDU comprises a Session Initiation Protocol (SIP) message envelope. In such cases, the functional content of an IN/AIN message may be inserted into a Multipurpose Internet Mail Extension (MIME) part of the SIP envelope.

Each network element may comprise a media gateway controller adapted to enable telephony signal traffic through the broadband packet network, or an application server adapted to invoke IN/AIN functionality using IN/AIN functional content. An application server may be either: a CCS network element adapted to send and receive PDU's of the broadband packet network; or a network element of the broadband packet network.

Encapsulation of the functional content of the transaction message may comprise the steps of: formulating a conventional transaction message; and inserting the formulated transaction message into a payload portion of the PDU.

Alternatively, encapsulation of the functional content of the transaction message may comprise mapping a transaction message onto the PDU. In some embodiments, the transaction message is a Transaction Capability-Application part (TCAP) message. In such cases, a TCAP message type is mapped onto a respective message type of the PDU. The TCAP message type may comprise any of: query; response; conversation; unidirectional and abort. In other embodiments, the transaction message is an Intelligent Network-Application part (INAP) message. In such cases, an INAP message type is mapped onto a respective message type of the PDU. The INAP message type may comprise any of: begin; end; continue; unidirectional and abort.

A transaction message parameter may also be mapped onto a respective PDU message parameter. The message parameter may comprise any one or more of: an origination address and a destination address, and may be mapped to a respective overhead field of the PDU. Finally, an encoded transaction message payload may be mapped into a payload of the PDU. The encoded message payload may be mapped into a payload portion of a MIME part of the PDU.

In embodiments of the invention, the transaction message comprises two or more encoded payload portions. Each encoded payload portion may be mapped to a respective individual MIME payload. Alternatively, the encoded payload portions may be mapped to a common MIME payload.

An advantage of the present invention is that conventional TCAP message functional content can be transported across the broadband packet network to an Application Server to invoke IN/AIN functionality, without utilizing legacy CCS network infrastructure. Consequently, IN/AIN functionality can be invoked in respect of telephony services deployed in the broadband packet network, without contributing to signaling port exhaustion in the CCS network.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
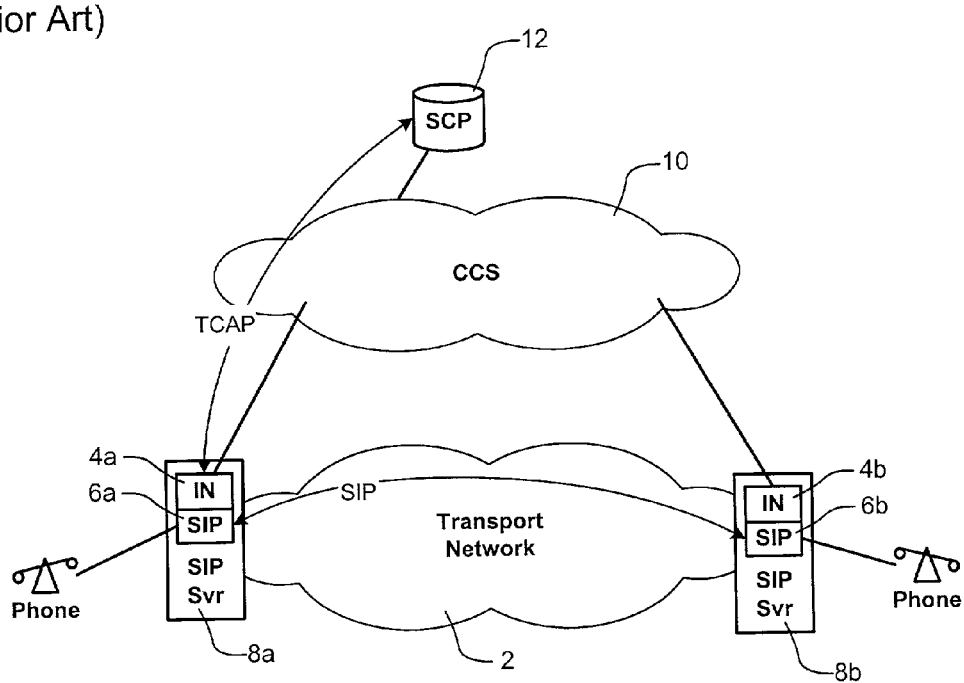
FIG. 1 is a block diagram schematically illustrating operations of a prior art system for accessing IN/AIN functionality for telephony services in a broadband packet network.
Figure 2:
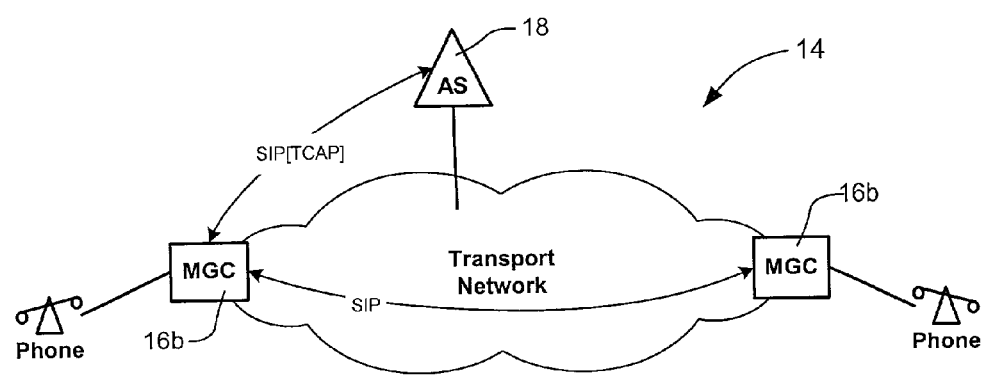
FIG. 2 is a block diagram schematically illustrating operations of a system for accessing IN/AIN functionality for telephony services in a broadband packet network, in accordance with an embodiment of the present invention.

The present invention provides a method and apparatus for enabling Intelligent Network/Advanced Intelligent Network (IN/AIN) functionality for telephony services deployed in a broadband packet network. FIG. 2 is a block diagram illustrating exemplary elements of a network 14 in which the present invention may be deployed.

As shown in FIG. 2, telephony services can be deployed within a broadband packet network 14 in a generally conventional manner. The broadband packet network 14 can be formed of one or more federated packet networks (e.g. Internet Protocol (IP), asynchronous transfer mode (ATM), frame relay (FR) and Integrated Services Digital network (ISDN)) with appropriate format adaptation at network boundaries. Communications sessions can be set up across the broadband packet network 14, e.g. between media gateway controllers (MGCs) 16a,16b using any known session control protocol, such as, for example, Session Initiation Protocol (SIP), which may encapsulate legacy Integrated Services Digital Network-User Part (ISUP) messages to enable connections to be set up across the Public Switched Telephone Network (PSTN) (not shown). IN/AIN functionality is provided by an application server (AS) 18, which may be provided as one or more legacy elements of the CCS network, such as, for example, Service Control Points (SCP's), Intelligent Peripherals (IPe's), and Interactive Voice Response (IVR) servers suitably adapted to enable signaling through the broadband packet network. Alternatively, the AS 18 may be provided as a server deployed in the broadband packet network 14. In the embodiment illustrated in FIG. 2, a single AS 18 is provided for invoking IN/AIN functionality. It will be understood that IN/AIN functionality will normally be provided by two or more devices, working alone or in combination. For ease of description of the present invention, a simplified network topology is presented, in which the IN/AIN functionality is enabled by interaction between a single MGC 16a of the broadband packet network and a single AS 18. It will be recognized, however, that the present invention is not limited to this simplified embodiment.

The present invention operates to enable Intelligent Network Application Part (INAP) and/or Transaction Capability-Application Part (TCAP) query/response transactions between MGCs 16 and application servers 18, bypassing the CCS network infrastructure for message transport. This operation enables IN/AIN functionality for telephony services deployed in the broadband packet network 14, without increasing the risk of port exhaustion in CCS network elements Thus in accordance with the present invention, at least the functional content of each INAP and/or TCAP message is encapsulated within a PDU of the broadband packet network, which is then used for message transport. In embodiments in which the AS 18 is provided by legacy CCS network elements (e.g. SCP's and IPe's), a logical connection between the broadband packet network 14 and the AS 18, in order to facilitate transport of TCAP-encapsulating PDU's, can be established using existing IP, FR or ISDN ports of the AS 18, which are commonly used for network management traffic. Alternatively, the AS 18 can be provisioned with new IP ports, in addition to and/or in place of existing SS7 ports. By virtue of the flexibility and scalability afforded by IP, it is typically easier and less expensive to add IP ports to an existing SCP, IVR, or IPe than it is to add equivalent SS7 ports.

The encapsulation of INAP and/or TCAP functional content within PDU's of the broadband packet network 14 will now be described in detail by way of an exemplary embodiment in which the broadband packet network 14 is an IP network (such as the public internet), and TCAP functional content is encapsulated within a SIP envelope. It will be appreciated that a closely similar method of encapsulation can be employed to encapsulate the functional content of INAP messages within PDU's of the broadband packet network 14. Accordingly, the following description will focus on the encapsulation of TACP functional content, with the understanding that the present invention is not intended to be limited to TCAP, but rather also includes encapsulation of INAP functional content.

Encapsulation of TCAP functional content within a SIP envelope can be accomplished by either inserting a conventional TCAP message into a payload portion of the SIP envelope, or by mapping TCAP messages to corresponding SIP messages. An exemplary mapping between TCAP and SIP messages is described below.

In general, mapping between TCAP and SIP messages involves three mappings, namely: mapping TCAP message types to SIP message types; mapping TCAP parameters to SIP parameters; and mapping TCAP message content to SIP envelope payload. Each of these mappings will be treated, in turn, in the following description.

Mapping TCAP Message Types To SIP Message Types

The first aspect of mapping TCAP to SIP involves mapping TCAP message types to SIP message types and status codes. As is known in the art, SIP messages are either requests or responses. Tables 1 and 2 below show exemplary mappings between TCAP message types (for both ANSI and ITU-T versions of TCAP) and SIP request and response message types, respectively.

TABLE 1

| SIP Request | Description | TCAP message type |
| --- | --- | --- |
| INVITE | Used to initiate a transaction | (ANSI) QUERY (ITU-T) BEGIN (ANSI and ITU-T) UNIDIRECTIONAL |
| BYE | Used to release a call that is currently connected | (ANSI and ITU-T) ABORT |

TABLE 2

| SIP Response/ Status Codes | Description | TCAP message type |
| --- | --- | --- |
| 1xx Informational 100 Trying 180/ 183 Ringing 182 Queued 187 Processing | Continuing to process the request Phrases corresponding to the numeric response codes may be replaced with local equivalents without affecting the protocol. Additional codes may be added as desired. | TCAP Message types other than begin/end messages (ANSI) CONVERSATION (ITU-T) CONTINUE |
| 2xx Success 200 OK | A final response indicating session has completed successfully | (ANSI) RESPONSE (ITU-T) END |
| 4xx Client Error | The request contains bad syntax or cannot be fulfilled at this server | used to indicate problems with TCAP encoding in the SIP message |
| 5xx Server Error | The server failed to fulfill an apparently valid request | used to indicate problems with TCAP encoding in the SIP message |

Using the above mappings, SIP request/response transactions performing the functional equivalent of legacy TCAP query/response transactions can be accomplished. FIGS. 3a–5b show message flows for three exemplary transactions, under TCAP and SIP.

Figure 3A:
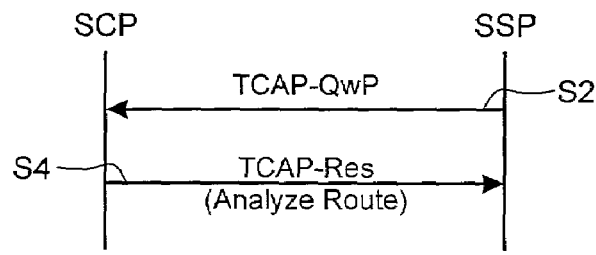
FIG. 3a is a message flow diagram showing principle messages exchanged in a TCAP query/response transaction in accordance with the prior art.
Figure 3B:
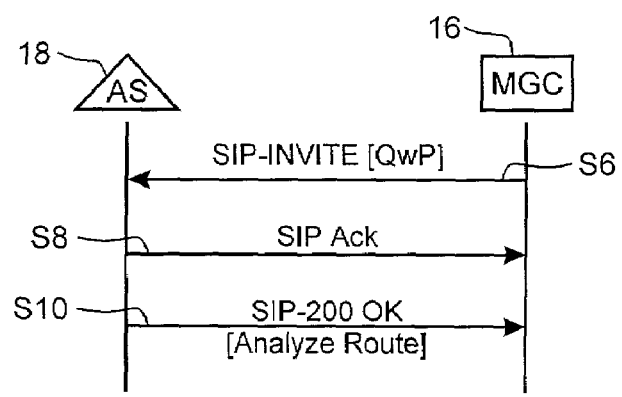
FIG. 3b is a message flow diagram showing principle messages exchanged in the query/response transaction of FIG. 3a utilizing TCAP encapsulated within SIP in accordance with an embodiment of the present invention.

FIG. 3a shows principle steps of a TCAP query/response transaction according to the prior art. As shown in FIG. 3a, an SSP forwards a TCAP-Query with Permission (QwP) to an SCP (at step S2), which responds by returning a TCAP-Response to the SSP (at step S4). The functional equivalent of this transaction, using SIP in accordance with the present invention is illustrated in FIG. 3b. Thus a SIP-Invite message encapsulating the content (e.g. dialed digits) of the TCAP-QwP message is forwarded by an MGC 16 to the AS 18 (at step S6), which responds, first with a SIP-Ack message (step S8), and then, subsequently, a SIP-200 OK message (step S10) encapsulating the content of the TCAP-Response message (e.g. analyzed route information).

Figure 4A:
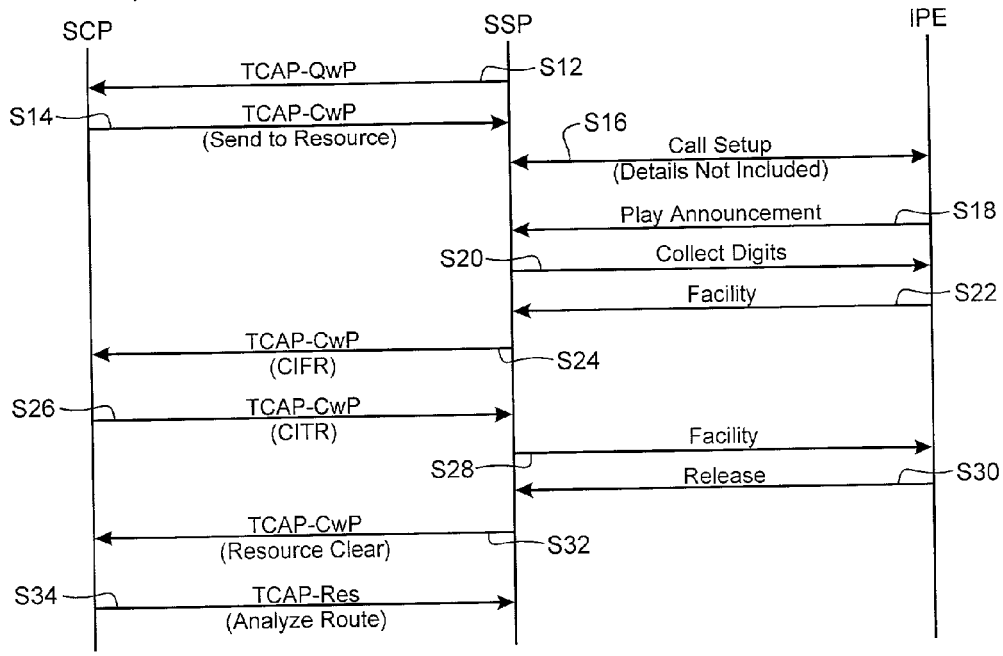
FIG. 4a is a message flow diagram showing principle messages exchanged in an AIN send-to-resource transaction in accordance with the prior art.

FIG. 4a shows principle steps of a "send to resource" conversation according to the prior art. As shown in FIG. 4a, an SSP forwards a TCAP-Query with Permission (QwP) to an SCP (at step S12), which responds by returning a TCAP-Response (send to resource) to the SSP (step S14). Based on the content of the TCAP-Response message, the SSP sets up a connection to an Intelligent Peripheral (IPe) (step S16), which can then perform various functions, such as playing an announcement (step S18), and/or collecting dialed digits (step S20). The IPe then forwards a Facility message (step S22) containing the results of its processing (e.g. dialed digits) to the SSP, which in turn forwards this data to the SCP in a TCAP-CwP (Call Information From Resource (CIFR)) message to the SCP (step S24). The SCP returns a TCAP-CwP (Call Information To Resource (CITR)) message to the SSP (step S26), which in turn forwards a Facility message containing the CITR information to the Intelligent Peripheral (step S28). The Intelligent Peripheral then sends a Release message to the SSP (step S30) to release the connection between the SSP and the IPe. Upon receipt of the Release message, the SSP sends a TCAP-CwP message indicating that the resource is clear to the SCP (step S32), which returns a TCAP-Response message to the SSP (step S34). As described above, the messages exchanged between the SCP and the SSP are TCAP messages. Conversely, messages exchanged between the SSP and the intelligent peripheral would normally be Private Rate Interface (PRI) protocol messages, conveyed over an Integrated Services Digital Network (ISDN) or ethernet link.

Figure 4B:
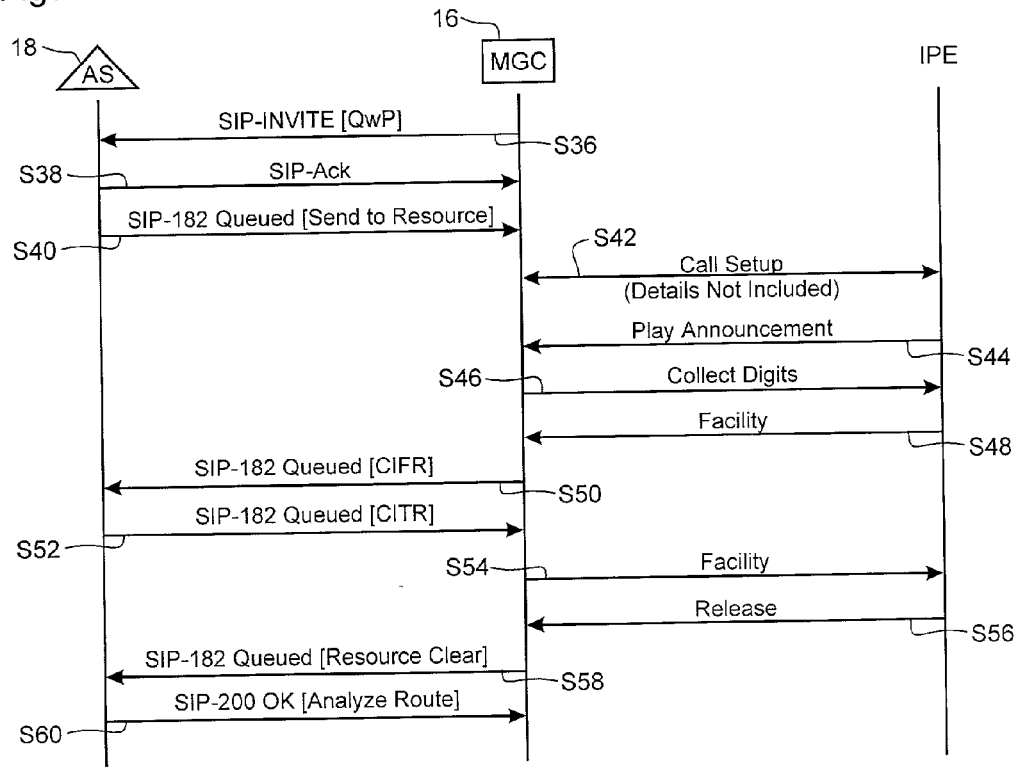
FIG. 4b is a message flow diagram showing principle messages exchanged in the AIN send-to-resource transaction of FIG. 4a utilizing TCAP encapsulated within SIP in accordance with an embodiment of the present invention.

FIG. 4b illustrates the equivalent "send to resource" transaction using SIP encapsulating TCAP in accordance with the present invention. As shown in FIG. 4b, an MGC 16 forwards a SIP-Invite message encapsulating the content of the TCAP-QwP message to the AS 18 (at step S36), which responds by returning first a SIP-Ack (step S38) and then a SIP-182 Queued message encapsulating the content of a TCAP "send to resource" message to the MGC 16 (step S40). Based on the content of the SIP-182 Queued message, the MGC 16 sets up a connection to an Intelligent Peripheral (Ipe) (step S42), which then performs various functions, such as playing an announcement (step S44) and/or collecting dialed digits (step S46). The Intelligent Peripheral then forwards a Facility message containing the results of its processing (e.g. dialed digits) to the MGC 16 (step S48), which in turn forwards this data to the AS 18 in a SIP-182 Queued message (step S50). The AS 18 returns a SIP-182 Queued message containing Circuit Information To Resource (CITR) information to the MGC 16 (step S52), which in turn forwards a Facility message containing the CITR information to the Intelligent Peripheral (step S54). The Intelligent Peripheral then sends a Release message to the MGC 16 (step S56) to release the connection between the MGC 16 and the IPe. Upon receipt of the Release message, the MGC 16 sends a SIP-182 Queued message indicating that the resource is clear to the AS 18 (step S58), which returns a SIP-200 OK message to the MGC 16 (step S60). As described above in respect of FIG. 4a, the signals between the MGC 16 and the intelligent peripheral would normally be in Private Rate Interface (PRI) messages, and may be conveyed over an Integrated Services Digital Network (ISDN) or ethernet link.

Figure 5A:
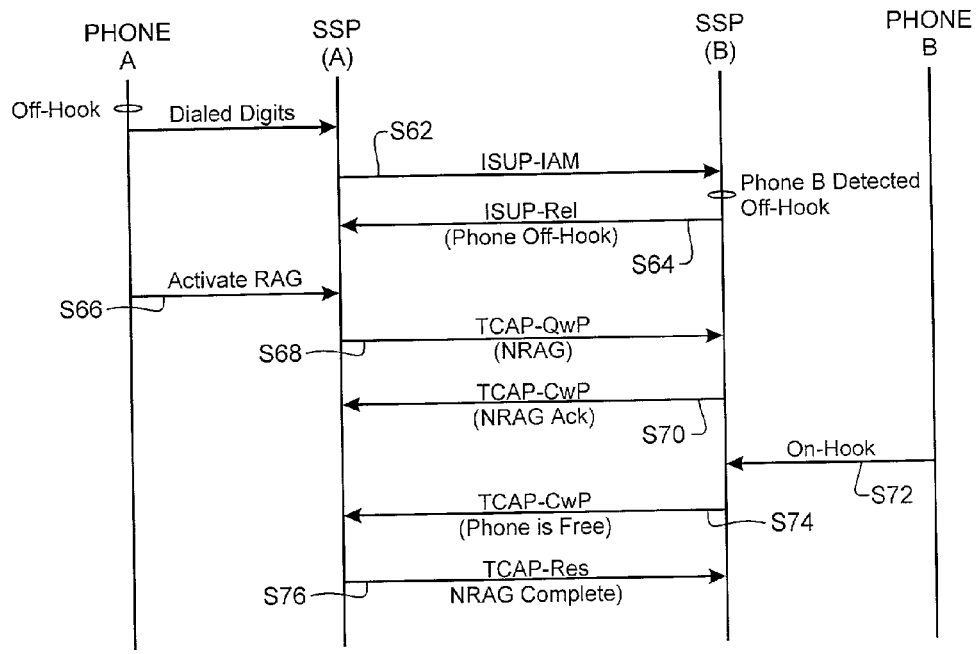
FIG. 5a is a message flow diagram showing principle messages exchanged in a TCAP Ring Again (RAG) transaction in accordance with the prior art.

FIG. 5a shows principle TCAP messages exchanged in a prior art Ring AGain (RAG) transaction. As shown in FIG. 5a, an attempt by a calling party to establish a telephone connection between phone A and a called party at phone B results in conventional ISUP-IAM messaging between SSP-A and SSP-B (step S62), which detects phone B in use (off hook) and therefore returns a conventional ISUP-Rel message to SSP-A (step S64). Upon receipt of the "busy" signal, the calling party activates the RAG feature and places phone A on-hook (step S66). As a result, SSP-A forwards a TCAP-QwP (NRAG) message to SSP-B (step S68), which responds with a TCAP-CwP message acknowledging the TCAP-QwP (NRAG) message (step S70). When the called party places phone B on-hook (step S72), SSP-B forwards a TCAP-CwP message to SSP-A (step S74), which responds with a TCAP (NRAG complete) message (step S76). SSP-A can then notify the calling party that the called party is now free (messaging not shown).

Figure 5B:
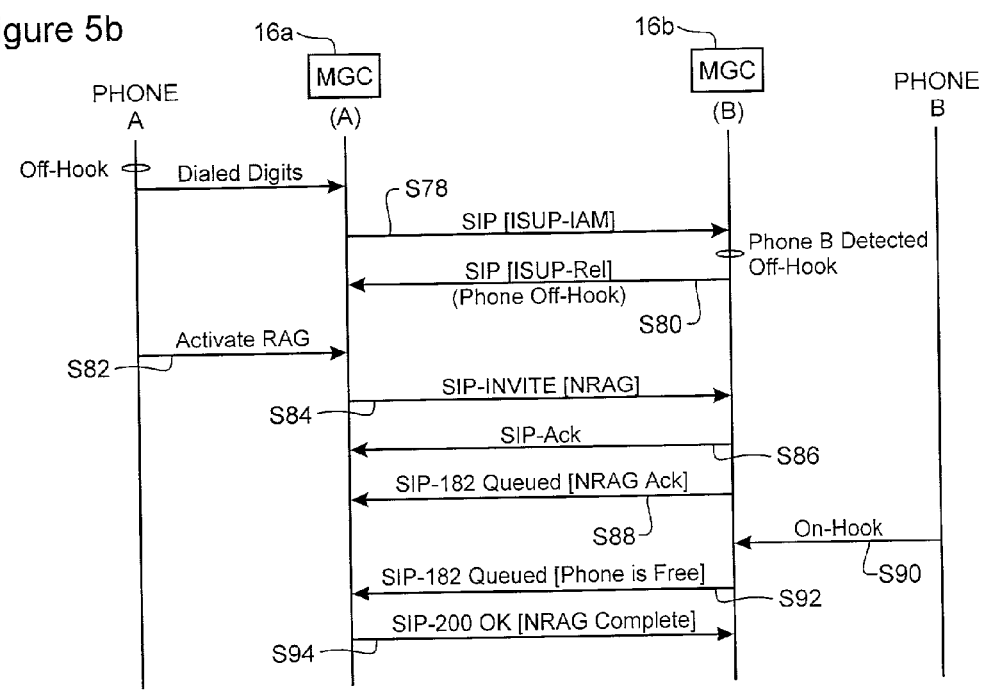
FIG. 5b is a message flow diagram showing principle messages exchanged in the RAG transaction of FIG. 5a utilizing TCAP encapsulated within SIP in accordance with an embodiment of the present invention.

FIG. 5b illustrates the equivalent Ring AGain (RAG) transaction using SIP encapsulating TCAP in accordance with the present invention. As shown in FIG. 5b, an attempt by a calling party to establish a telephone connection between phone A and a called party at phone B results in conventional SIP and/or SIP encapsulating ISUP messaging between MGC-A 16a and MGC-B 16b (step S78), which detects phone B in use (off hook) and therefore returns a conventional SIP (release) message to MGC-A 16a (step S80). Upon receipt of the "busy" signal, the calling party activates the RAG feature (step S82) and places phone A on-hook. As a result, MGC-A 16a forwards a SIP-Invite message encapsulating the content of the TCAP-QwP (NRAG) message to MGC-B 16b (step S84), which responds, first with a SIP-Ack message (step S86), and then with a SIP-182 Queued message (step S88) acknowledging the SIP-Invite message. When the called party places phone B on-hook (step S90), MGC-B 16b forwards a SIP-182 Queued message to MGC-A 16a (step S92), which responds with a SIP-200 OK message (step S94). MGC-A 16a will then notify the calling party that the called party is now free (messaging not illustrated).

Figure 6:
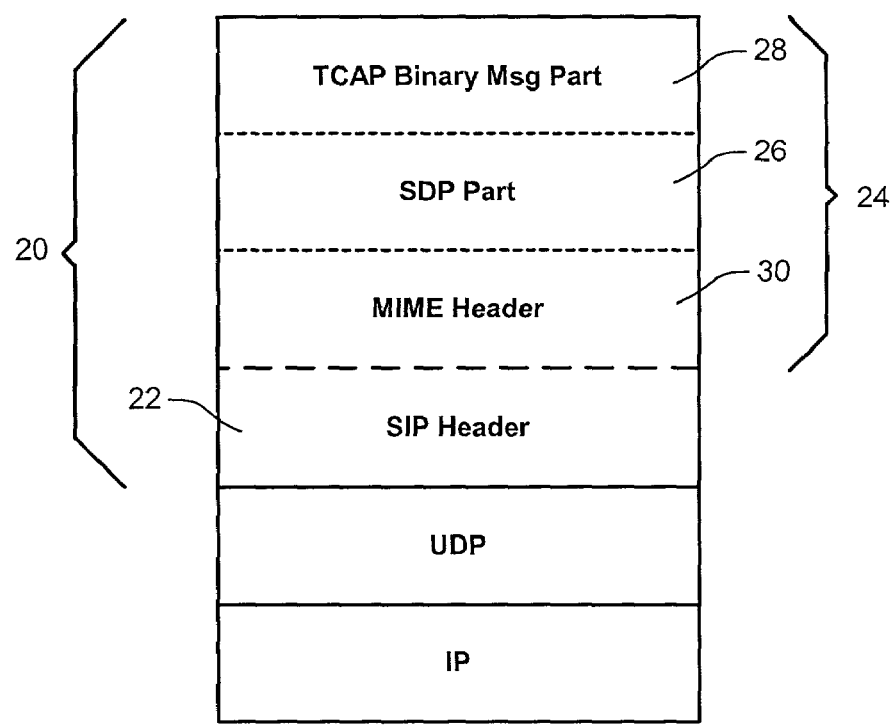
FIG. 6 is a block diagram schematically illustrating an exemplary model for a SIP envelope encapsulating TCAP functional content in accordance with an embodiment of the present invention.

FIG. 6 is a block diagram schematically illustrating an exemplary model for a SIP envelope 20 encapsulating TCAP functional content in accordance with an embodiment of the present invention. In the embodiment of FIG. 6, the SIP envelope 20 contains identification information in a SIP header 22, along with a Multipurpose Internet Mail Extension (MIME) part 24, which includes Session Description Protocol (SDP) description information 26 and a TCAP binary message part 28, separated by unique boundaries. The SIP envelope can be transported through the broadband packet network 14 using, for example, User Datagram Packet (UDP) protocol over IP.

The SIP header 22 and SDP part 26 provide for session control, while the MIME ports 24 provide a description language which adds differing file types to the SIP envelope 20. Each of these parts share the following attributes:
they are text-based (ASCII or ISO 10646);
each is used for a specific, unique purpose;
they can carry and/or encode information for that purpose; and
each is implemented following a distinct set of rules.

As is known in the art, SIP is an application-layer control protocol for creating, modifying and terminating sessions between two or more devices. For the purposes of encapsulating TCAP functional content in accordance with the present invention, SIP clients are used to communicate transaction information that may result in user agent behaviour. Table 3 below presents exemplary SIP header 22 field definitions and example values that may be used in the context of the present invention. For a basic level of session control, the SIP header 22 may include the 'From', 'To', 'Call-ID', 'Content-Type' and 'Content-Length' fields. Other known SIP header fields may be utilized, in a known manner, to provide an enhanced level of session control.

TABLE 3

| Field | Field definition | Accepted values |
| --- | --- | --- |
| From: | address of the "originating" machine | username/machine ID and/or IP address |
| To: | address of the "destination" machine | username/machine ID and/or IP address |
| Call-ID: | Uniquely identifies an invitation or all registrations of a particular client, | any combination of: the unique call number; time-stamp; and originating/terminating SIP Call Server. |
| Content-Type: | Indicates the type of material to follow. | Any of: 'application/multipart' 'application/sdp', 'text/html' etc. |
| Content Length | Indicates the length of the following data, the length of the message body | Set to the size of the MIME, SDP and TCAP data attached to the SIP header. |

Using the above field definitions, an exemplary SIP header 22 for use in the present invention is as follows:

INVITE    sip:callserverA@sipserver.nortelnetworks.com SIP/2.0

From: sip:callserverA@sipserver.nortelnetworks.com

To: sip:appserver123@sipserver.nortelnetworks.com

Call-ID: 1998122516401234@callserverA.nortelnetworks.com

Content-Type: Application/Multipart

Content-Length: 273

As its name suggests, the SDP part 26 is used to handle description information for a communications session (e.g. between the MGC 16 and the AS 18). The SDP part 26 provides endpoint and connection information, and is identified within the SIP header 22 by a Content-Type field statement of the form:

Content-Type: application/SDP; charset: ISO-10646.

Exemplary field definitions and contents of the SDP part 26 are provided in Table 4 below.

TABLE 4

| Field | Description | Example values |
| --- | --- | --- |
| v | Version: | protocol version number |
| o | Origin: owner or creator and session identifier The value of this field must uniquely identify the session | o = <username><session id><version> <network type><address type><address> <username> is preferably the Calling Party from the SCCP global title. |
| s | Session Name: | A text description |
| m | Media Description: Name and Transport address | m = <media> <port> <transport> <fmt list> <media> may be any of "audio", "video", "application", "data" or "control" |
| c | Connection Data This is an optional field | 'IN' (Internet) followed by the 'IP4' (identifying the IP version 4 method of IP address ID) followed by the connection IP address. Other variations exist, including TTL information for multicast addresses. |

TABLE 4-continued

| Field | Description | Example values |
| --- | --- | --- |
| e, p | Email Address and Phone Number e = <email address> p = <phone number> These fields specify contact information of the person responsible for the Conference. This may not Be the initiator of the session. These are an optional field | This field may be used to reflect the Calling Party address from the SCCP global title address. |

Using the above field definitions, an exemplary SDP port 26 for use in the present invention is as follows.

--unique-boundary-1-

Content-Type: application/multipart; charset=ISO-10646 v=0 o=jnicoletta 2890844526 2890842807 IN IP4 126.16.64.4 s=SDP seminar c=IN IP4 MGCX.nortelnetworks.com p=+1 613 722 1000 m=application/TCAP 9092 udp 0 3 4

As is known in the art, MIME was originally designed to attach files to email messages, but can be readily adapted for use in other transport systems. For the purposes of the present invention, the MIME part 24 is used to attach the TCAP binary message part 28 to the end of the SIP/SDP combination. MIME multipart payloads enable a SIP envelope 20 to carry any PSTN/CCS signaling information required to invoke IN/AIN functionality. The multipart body can consist of any combination of: SDP payload; TCAP payload; and/or any number of MIME types.

TCAP can contain multiple components. In accordance with the present invention, it is possible to encapsulate a multipart TCAP message in one MIME payload, or alternatively to encapsulate each TCAP component in a respective individual MIME payload. In general, the MIME header 30 follows the SIP header 22, and will take the form of the following exemplary MIME header:

MIME-Version: 1.0

Content-Type: multipart/mixed; boundary=unique-boundary-1

An exemplary MIME payload 28 carrying TCAP binary message payload in accordance with the present invention is as follows:

--unique-boundary-1

Content-type:application/TCAP;version=0;base=ansi88

Content-Transfer-Encoding: binary 89 8b 0e 95 1e 1e 1e 06 26 05 0d f5 01 06 10 04 00

--unique-boundary-1-

The above described mappings enable the functional content of TCAP messages to be encapsulated within SIP envelopes 20 for transport through a broadband packet network 14. The encapsulation of TCAP functional content will now be further described by way of three exemplary SIP messages as follows: a SIP-INVITE message encapsulating a TCAP Query; a SIP-182 Queued message encapsulating a TCAP Conversation with Permission message; and a SIP-200 OK message encapsulating a TCAP response message.

The SIP message format requires the first line to be a 'Request' line, followed by a series of 'Header' lines, a <CRLF> separator, and, lastly, the message body. In the present example, the SDP Part 26 and MIME payload 28 are separated by a boundary parameter which, for this example, has the value of "unique-boundary-1".

INVITE sip:callserverA@sipserver.nortelnetworks.com SIP/2.0
From: sip:callserverA@sipserver.nortelnetworks.com
To: sip:appserver123@sipserver.nortelnetworks.com
Call-ID: 1998122516401234@callserverA.nortelnetworks.com
Content-Type: Application/Multipart
Content-Length: 273
MIME-Version: 1.0
Content-Type: multipart/mixed; boundary=unique-boundary-1
21 CRLF>
-unique-boundary-1
Content-Type: application/SDP; charset=ISO-10646
v=0
o=markbos 1234567890 1234567890 IN IP4 190.3.109.6
s=SDP seminar
c=IN IP4 confserver.nortelnetworks.com
t=234567890 1234567890
p=+1 613 722 1000
m=application 9092 UDP 0 3 4
--unique-boundary-1
Content-type:application/TCAP;version=0;base=ansi88
Content-Transfer-Encoding: binary
89 8b 0e 95 1e 1e 1e 06 26 05 0d f5 01 06 10 04 00
--unique-boundary-1-

FIGS. 3b, 4b and 5b illustrate the use of SIP-182 Queued messages for encapsulating the functional content of TCAP Conversation with Permission messages. An exemplary SIP-182 Queued message usable for this purpose is as follows:

SIP[TCAP]/0.0 182 Queued
From: callserverB <sip:callserverB.nortelnetworks.com>
To: callserverA <sip:callserverA.nortelnetworks.com>
Call-ID: 1998122516401234@callserverB.nortelnetworks.com
Content-Length: 122
Cseq: 1
MIME-Version: 1.0
Content-Type: application/tcap;base=ansi92
Content-Transfer-Encoding: binary
    <TCAP Binary message part encoded here>

FIGS. 3b, 4b and 5b also illustrate the use of SIP-200 OK messages for encapsulating the functional content of TCAP response messages. An exemplary SIP-200 OK message usable for this purpose is as follows:

SIP[TCAP]/0.0 200 OK
From: callserverA <sip:me.nortelnetworks.com>
To: callserverB <sip:callserverB.nrtelnetworks.com>
Call-ID: 1998122516401234@callserverB.nortelnetworks.com
CSeq: 2 BYE
MIME-Version: 1.0
Content-Type: application/tcap;base=ansi92
Content-Transfer-Encoding: binary
    <TCAP Binary message part encoded here>

The embodiment(s) of the invention described above is(are) intended to be exemplary only. The scope of the invention is therefore intended to be limited solely by the scope of the appended claims.

We claim:

1. A method of enabling distributed transaction oriented telephony functionality for telephony services deployed in a broadband packet network, the method comprising steps of:
   at a first network element comprising a media gateway controller adapted to enable telephony signal traffic through the broadband packet network, encapsulating a functional content of a transaction message in a Protocol Data Unit (PDU) of the broadband packet network;
   forwarding the PDU through the broadband packet network to a second network element; and
   at the second network element, invoking the functionality using the encapsulated transaction message functional content.

2. A method as claimed in claim 1, wherein the distributed transaction oriented telephony functionality comprises intelligent network/advanced intelligent network (IN/AIN) functionality.

3. A method as claimed in claim 1, wherein the broadband packet network comprises any one or more of: an Asynchronous Transfer Mode (ATM) network; an internet Protocol (IP) network; a Frame Relay (FR) network; and an Integrated Services Digital Network (ISDN).

4. A method as claimed in claim 3, wherein the broadband packet network comprises an IP Network, and the PDU comprises a Session Initiation Protocol (SIP) message envelope.

5. A method as claimed in claim 1, wherein the second network element comprises an application server adapted to invoke the functionality using transaction message functional content.

6. A method as claimed in claim 5, wherein the application server comprises either one of:
   a CCS network element adapted to send and receive PDU's of the broadband packet network; and
   a network element of the broadband packet network.

7. A method as claimed in claim 1, wherein the step of encapsulating the functional content of the transaction message comprises the steps of:
   formulating a transaction message; and
   inserting the formulated transaction message into a payload portion of the PDU.

8. A method as claimed in claim 7, wherein the transaction message comprises either one of a Transaction Capabilities Application Part (TCAP) message and an Intelligent Network Application Pan (NAP) message.

9. A method as claimed in claim 1, wherein the step of encapsulating the functional content of the transaction message comprises a step of mapping the transaction message onto the PDU.

10. A method as claimed in claim 9, wherein the transaction message comprises a Transaction Capabilities Application Part (TCAP) message.

11. A method as claimed in claim 10, wherein the step of mapping comprises a step of mapping a TCAP message type onto a respective message type of the PDU.

12. A method as claimed in claim 11, wherein the TCAP message type comprises any one or more of: query; response; conversation; unidirectional; and abort.

13. A method as claimed in claim 9, wherein the transaction message comprises an Intelligent Network-Application Part (INAP) message.

14. A method as claimed in claim 13, wherein the step of mapping comprises a step of mapping an INAP message type onto a respective message type of the PDU.

15. A method as claimed in claim 14, wherein the INAP message type comprises any one or more of: begin; end; continue; unidirectional; and abort.

16. A method as claimed in claim 9, wherein the step of mapping comprises a step of mapping a transaction message parameter onto a respective PDU message parameter.

17. A method as claimed in claim 16, wherein the transaction message parameter comprises any one or more of: an origination address and a destination address.

18. A method as claimed in claim 16, wherein the transaction message parameter is mapped to a respective overhead field of the PDU.

19. A method as claimed in claim 9, wherein the step of mapping comprises a step of mapping an encoded message payload into a payload of the PDU.

20. A method as claimed in claim 19, wherein the encoded message payload is mapped into a payload portion of a MIME part of the PDU.

21. A method as claimed in claim 20, wherein the transaction message comprises two or more encoded payload portions.

22. A method as claimed in claim 21, wherein each encoded payload portion is mapped to a respective individual MIME payload.

23. A method as claimed in claim 21, wherein the encoded payload portions are mapped to a common MIME payload.

24. A system enabling distributed transaction oriented telephony functionality for telephony services in a broadband packet network, the system comprising:
   a first network element adapted to encapsulate a functional content of a transaction message in a Protocol Data Unit (PDU) of the broadband packet network, wherein the first network element comprises a media gateway controller adapted to enable telephony signal traffic through the broadband packet network; and
   a second network element adapted to invoke the functionality using the encapsulated transaction message functional content.

25. A system as claimed in claim 24, wherein the distributed transaction oriented telephony functionality comprises intelligent network/advanced intelligent network (IN/AIN) functionality.

26. A system as claimed in claim 24, wherein the broadband packet network comprises any one or more of: an Asynchronous Transfer Mode (ATM) network; an internet Protocol (IP) network; a Frame Relay (FR) network; and an Integrated Services Digital Network (ISDN).

27. A system as claimed in claim 24, wherein the broadband packet network comprises an IP Network, and the PDU comprises a Session Initiation Protocol (SIP) message envelope.

28. A system as claimed in claim 24, wherein the second network element comprises an application server adapted to invoke the functionality using transaction message functional content.

29. A system as claimed in claim 28, wherein the application server comprises either one of:
   a CCS network element adapted to send and receive PDU's of the broadband packet network; and
   a network element of the broadband packet network.

30. A system as claimed in claim 24, wherein the first network element comprises:
   means for formulating a transaction message; and
   means for inserting the formulated transaction message into a payload portion of the PDU.

31. A method as claimed in claim 30, wherein the transaction message comprises either one of a Transaction Capabilities Application Part (TCAP) message and an Intelligent Network Application Part (INAP) message.

32. A system as claimed in claim 24, wherein the first network element comprises means for mapping the transaction message onto the PDU.

33. A system as claimed in claim 32, wherein the transaction message comprises a Transaction Capabilities Application Pan (TCAP) message.

34. A system as claimed in claim 33, wherein the means for mapping comprises means for mapping the TCAP message type onto a respective message type of the PDU.

35. A system as claimed in claim 34, wherein the TCAP message type comprises any one or more of: query; response; conversation; unidirectional and abort.

36. A system as claimed in claim 32, wherein the transaction message comprises an Intelligent Network-Application Part (INAP) message.

37. A system as claimed in claim 36, wherein the means for mapping comprises means for mapping an INAP message type onto a respective message type of the PDU.

38. A system as claimed in claim 39, wherein the INAP message type comprises any one or more of: begin; end; continue; unidirectional and abort.

39. A system as claimed in claim 32, wherein the means for mapping comprises means for mapping a transaction message parameter onto a respective PDU message parameter.

40. A system as claimed in claim 39, wherein the transaction message parameter comprises any one or more of: an origination address and a destination address.

41. A system as claimed in claim 40, wherein the transaction message parameter is mapped to a respective overhead field of the PDU.

42. A system as claimed in claim 32, wherein the means for mapping comprises means for mapping an encoded message payload into a payload of the PDU.

43. A system as claimed in claim 42, wherein the encoded message payload is mapped into a payload portion of a MIME part of the PDU.

44. A system as claimed in claim 43, wherein the transaction message comprises two or more encoded payload portions.

45. A system as claimed in claim 44, wherein each encoded payload portion is mapped to a respective individual MIME payload.

46. A system as claimed in claim 44, wherein the encoded payload portions are mapped to a common MIME payload.

47. A network node enabling distributed transaction oriented telephony functionality for telephony services in a broadband packet network, the node comprising means for encapsulating at least a functional content of a transaction message in a Protocol Data Unit (PDU) of the broadband packet network, and wherein the node comprises either one of:
   a media gateway controller operative to enable telephony signal traffic through the broadband packet network; and
   an application server operative to invoke IN/AIN functionality using TCAP functional content.

48. A node as claimed in claim 47, wherein the distributed transaction oriented telephony functionality comprises intelligent network/advanced intelligent network (IN/AIN) functionality.

49. A node as claimed in claim 47, wherein the broadband packet network comprises any one or more of: an Asynchronous Transfer Mode (ATM) network; an internet Protocol (IP) network; a Frame Relay (FR) network; and an Integrated Services Digital Network (ISDN).

50. A node as claimed in claim 49, wherein the broadband packet network comprises an IP Network, and the PDU comprises a Session Initiation Protocol (SIP) message envelope.

51. A node as claimed in claim 47, wherein the application server comprises either one of:
- a CCS network element adapted to send and receive PDU's of the broadband packet network; and
- a network element of the broadband packet network.

52. A node as claimed in claim 47, further comprising:
means for formulating a transaction message; and
means for inserting the formulated transaction message into a payload portion of the PDU.

53. A node as claimed in claim 52, wherein the transaction message comprises either one of a Transaction Capabilities Application Part (TCAP) message and an Intelligent Network Application Part (INAP) message.

54. A node as claimed in claim 47, further comprising means for mapping the transaction message onto the PDU.

55. A node as claimed in claim 54, wherein the transaction message comprises a Transaction Capability Application Part (TCAP) message.

56. A node as claimed in claim 55, wherein the means for mapping comprises means for mapping a TCAP message type onto a respective message type of the PDU.

57. A node as claimed in claim 56, wherein the TCAP message type comprises any one or more of: query; response; conversation; unidirectional; and abort.

58. A node as claimed in claim 54, wherein the transaction message is an Intelligent Network Application Part (INAP) message.

59. A node as claimed in claim 58, wherein the means for mapping comprises means for mapping the INAP message type onto a respective message type of the PDU.

60. A node as claimed in claim 59, wherein the NAP message type comprises any one or more of: begin; end; continue; unidirectional; and abort.

61. A node as claimed in claim 54, wherein the means for mapping comprises means for mapping a transaction message parameter onto a respective PDU message parameter.

62. A node as claimed in claim 61, wherein the transaction message parameter comprises any one or more of: an origination address and a destination address.

63. A node as claimed in claim 61, wherein the transaction message parameter is mapped to a respective overhead field of the PDU.

64. A node as claimed in claim 54, wherein the means for mapping comprises means for mapping an encoded message payload into a payload of the PDU.

65. A node as claimed in claim 64, wherein the encoded message payload is mapped into a payload portion of a MIME part of the PDU.

66. A node as claimed in claim 65, wherein the transaction message comprises two or more encoded payload portions.

67. A node as claimed in claim 66, wherein each encoded payload portion is mapped to a respective individual MIME payload.

68. A node as claimed in claim 66, wherein the encoded payload portions are mapped to a common MIME payload.

* * * * *

UNITED STATES PATENT AND TRADEMARK OFFICE
CERTIFICATE OF CORRECTION

PATENT NO. : 7,058,068 B2 Page 1 of 1
APPLICATION NO. : 09/725921
DATED : June 6, 2006
INVENTOR(S) : Michael M. Gawargy et al.

It is certified that error appears in the above-identified patent and that said Letters Patent is hereby corrected as shown below:

Column 11, line 16, "21 CRLF>" should read --<CRLF>--.
Column 12, line 48 "Pan (NAP)" should read --Part (INAP)--.
Column 14, line 8, "Pan" should read --Part--.

Signed and Sealed this

Thirty-first Day of October, 2006

JON W. DUDAS
*Director of the United States Patent and Trademark Office*